United States Patent
Lee et al.

(10) Patent No.: US 9,313,483 B2
(45) Date of Patent: Apr. 12, 2016

(54) POLARIZATION SWITCHING DEVICE, DRIVER OF POLARIZATION SWITCHING DEVICE, AND METHOD OF DRIVING THE SAME

(75) Inventors: Jong Jae Lee, Asan-si (KR); Jun Dal Kim, Daegu (KR); Cheol-Ho Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 615 days.

(21) Appl. No.: 13/480,256

(22) Filed: May 24, 2012

(65) Prior Publication Data

US 2013/0135285 A1    May 30, 2013

(30) Foreign Application Priority Data

Nov. 24, 2011    (KR) .................. 10-2011-0123577

(51) Int. Cl.
| | |
|---|---|
| G09G 5/00 | (2006.01) |
| G06F 3/038 | (2013.01) |
| G09G 3/36 | (2006.01) |
| H04N 13/04 | (2006.01) |
| G06T 15/00 | (2011.01) |
| G09G 5/10 | (2006.01) |
| G09G 3/00 | (2006.01) |

(52) U.S. Cl.
CPC ....... *H04N 13/0434* (2013.01); *H04N 13/0486* (2013.01); *G09G 3/003* (2013.01); *G09G 3/36* (2013.01)

(58) Field of Classification Search
CPC ...... G09G 3/36; G09G 3/003; H04N 13/0434
USPC ............................. 345/212, 87–104, 690–691
See application file for complete search history.

(56) References Cited

U.S. PATENT DOCUMENTS

| | | | |
|---|---|---|---|
| 7,952,548 B2 | 5/2011 | Kim et al. | |
| 2006/0139235 A1 | 6/2006 | Lee | |
| 2007/0091058 A1 | 4/2007 | Nam et al. | |
| 2011/0063533 A1* | 3/2011 | Kim ................... | H04N 13/0456 349/15 |
| 2011/0096252 A1 | 4/2011 | Im | |
| 2011/0273440 A1* | 11/2011 | Park et al. ..................... 345/419 | |
| 2011/0273480 A1* | 11/2011 | Park ................... | G02B 27/2264 345/690 |
| 2012/0013610 A1* | 1/2012 | Chae ..................... | G02B 27/22 345/419 |
| 2012/0038690 A1* | 2/2012 | Lee ..................... | G02B 27/2264 345/691 |
| 2012/0113161 A1* | 5/2012 | Hong et al. ................... 345/690 | |

FOREIGN PATENT DOCUMENTS

| | | |
|---|---|---|
| JP | 2010-090231 | 4/2010 |
| JP | 2011-022512 | 2/2011 |

(Continued)

*Primary Examiner* — Temesgh Ghebretinsae
*Assistant Examiner* — Kwin Xie
(74) *Attorney, Agent, or Firm* — H.C. Park & Associates, PLC

(57) ABSTRACT

A polarization switching device includes a lower panel; an upper panel facing the lower panel; a liquid crystal layer disposed between the lower panel and the upper panel; and a driver to apply a first driving voltage and a second driving voltage to the lower panel and the upper panel, respectively, the first driving voltage to transition among a center voltage, a first voltage and a second voltage. The first voltage and the second voltage have the same difference in value from the center voltage. The driver includes a voltage changing unit to generate the first voltage and the second voltage based on a digital data input to a first digital-analog converter.

21 Claims, 5 Drawing Sheets

(56) References Cited

FOREIGN PATENT DOCUMENTS

| KR | 10-2006-0010167 | 2/2006 |
| KR | 10-2006-0078639 | 7/2006 |
| KR | 10-2007-0046450 | 5/2007 |
| KR | 10-2009-0033624 | 4/2009 |
| KR | 10-2009-0056032 | 6/2009 |
| KR | 10-2010-0128019 | 12/2010 |

* cited by examiner

POLARIZATION SWITCHING DEVICE, DRIVER OF POLARIZATION SWITCHING DEVICE, AND METHOD OF DRIVING THE SAME

CROSS-REFERENCE TO RELATED APPLICATION

This application claims priority from and the benefit of Korean Patent Application No. 10-2011-0123577, filed on Nov. 24, 2011, which is hereby incorporated by reference for all purposes as if fully set forth herein.

BACKGROUND OF THE INVENTION

1. Field of the Invention

Exemplary embodiments of the present invention relate to a polarization switching device and a driver of the polarization switching device, and a method of driving a polarization switching device.

2. Discussion of the Background

A 3D image display technology typically creates a three-dimensional effect of an object using binocular parallax, which is the most important element for recognizing a three-dimensional effect at a short distance. In other words, when different 2D images are directed to the left eye and the right eye, respectively, and the image directed to the left eye ("left eye image") and the image directed to the right eye ("right eye image") are transmitted to the brain, the left eye image and the right eye image are fused in the brain to be recognized as a 3D image having depth perception.

A three-dimensional image display device uses the binocular parallax and is classified into a stereoscopic type using glasses such as shutter glasses, polarized glasses, or the like and an autostereoscopic type in which a lenticular lens and a parallax barrier, or the like are disposed in a display device without using glasses.

According to the polarized glass type, a polarization switching panel, a patterned retarder, or the like are separately attached to a general LCD panel.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the present invention provides a polarization switching device, including: a lower panel; an upper panel facing the lower panel; a liquid crystal layer disposed between the lower panel and the upper panel; and a driver to apply a first driving voltage and a second driving voltage to the lower panel and the upper panel, respectively, the first driving voltage to transition among a center voltage, a first voltage and a second voltage. The first voltage and the second voltage having the same difference in value from the center voltage. The driver includes a voltage changing unit to generate the first voltage and the second voltage based on a digital data input to a first digital-analog converter.

Another exemplary embodiment of the present invention provides a driver of a polarization switching device, including: a voltage changing unit to generate a first voltage and a second voltage having the same difference in value from a center voltage based on the center voltage and digital data input to a first digital-analog converter. The driver is configured to left-eye circularly polarize or right-eye circularly polarize linearly polarized light.

Yet another exemplary embodiment of the present invention provides a method of driving a polarization switching device, including: generating a first voltage and a second voltage based on a digital data input to a first digital-analog converter, the first voltage and the second voltage having the same difference in value from a center voltage with different polarities from each other; transitioning the first driving voltage among the center voltage, a first voltage and a second voltage; and applying the first driving voltage and the second driving voltage to a lower panel and an upper panel, respectively.

It is to be understood that both the foregoing general description and the following detailed description are exemplary and explanatory and are intended to provide further explanation of the invention as claimed.

DETAILED DESCRIPTION OF THE ILLUSTRATED EMBODIMENTS

Figure 1:
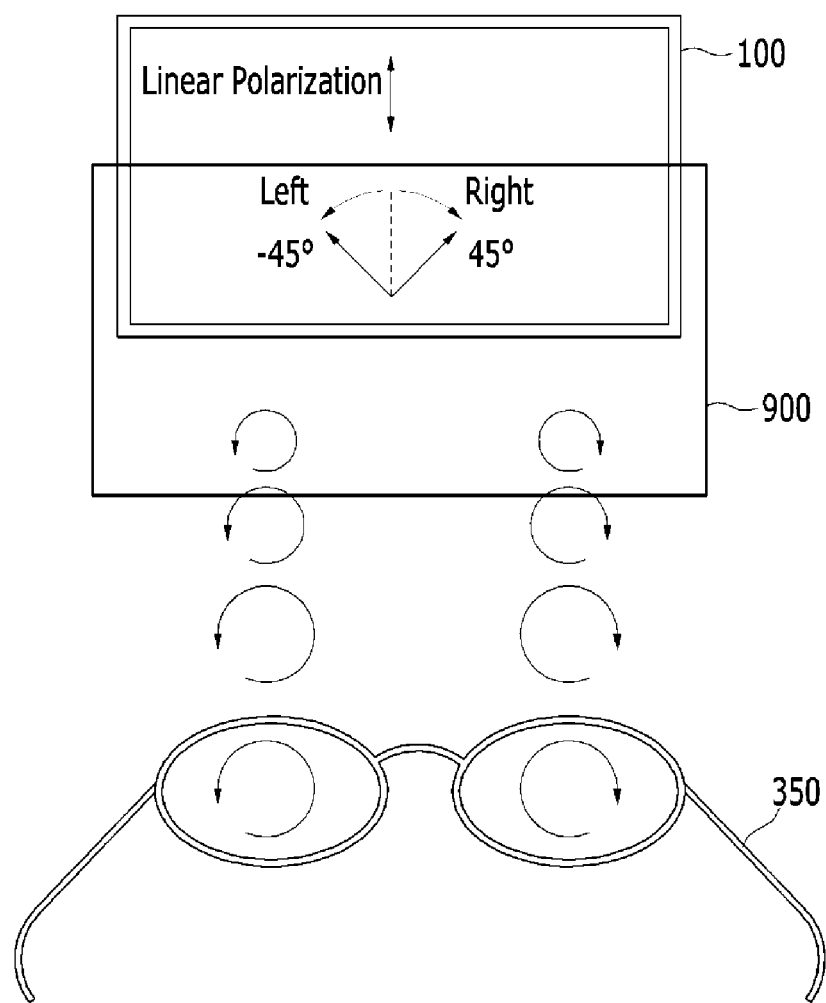
FIG. 1 is a view schematically showing an operation of a polarization switching device according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In addition, the detailed description of the widely known technologies will be omitted In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

Hereinafter, a driver of a polarization switching panel and a polarization switching device according to exemplary embodiments of the present invention will be described in detail with reference to FIG. 1 to FIG. 5.

Figure 2:
FIG. 2 is a cross-sectional view schematically showing a polarization switching device according to an exemplary embodiment of the present invention.
Figure 3:
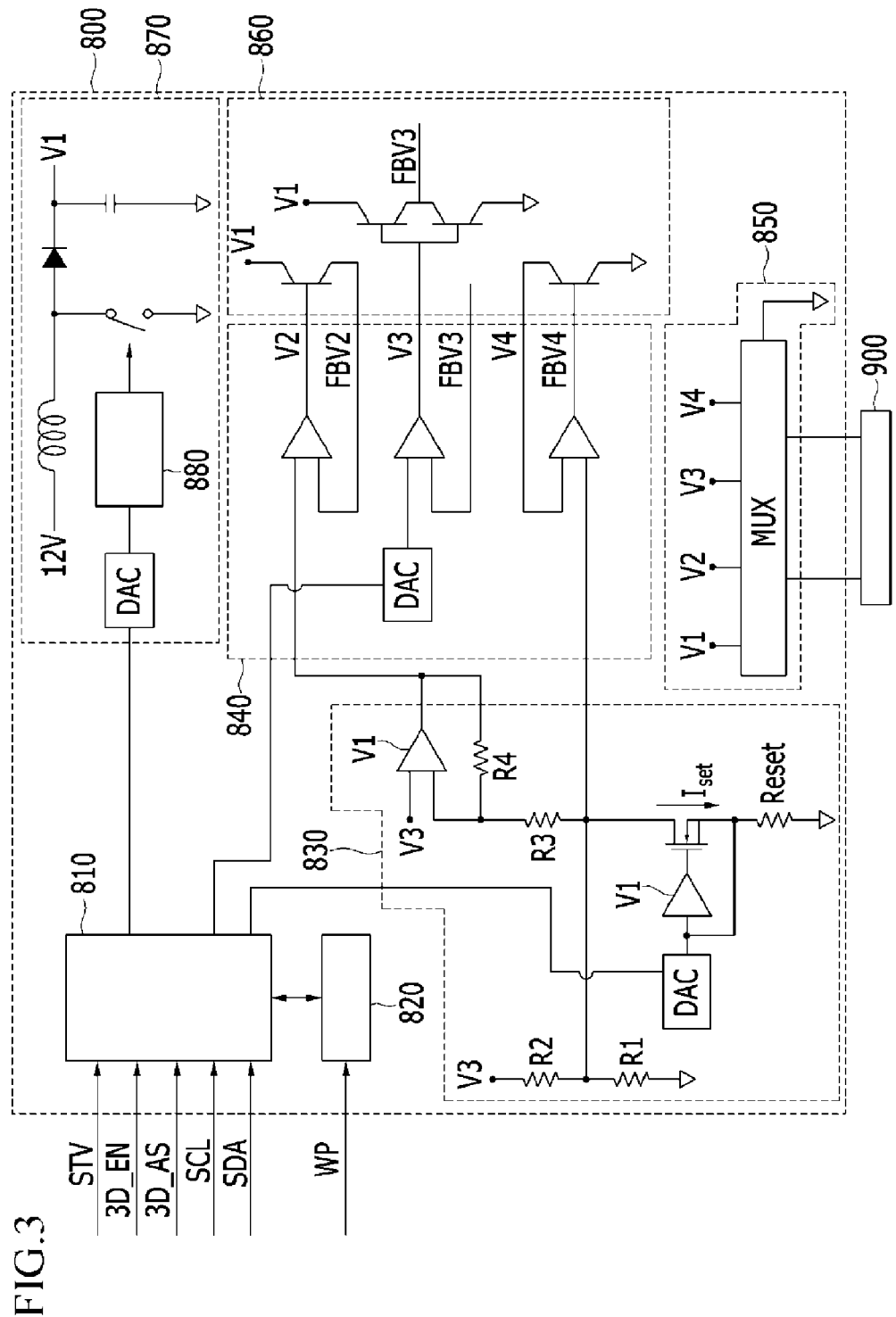
FIG. 3 is a view schematically showing a driver of a polarization switching panel according to an exemplary embodiment of the present invention.
Figure 4:
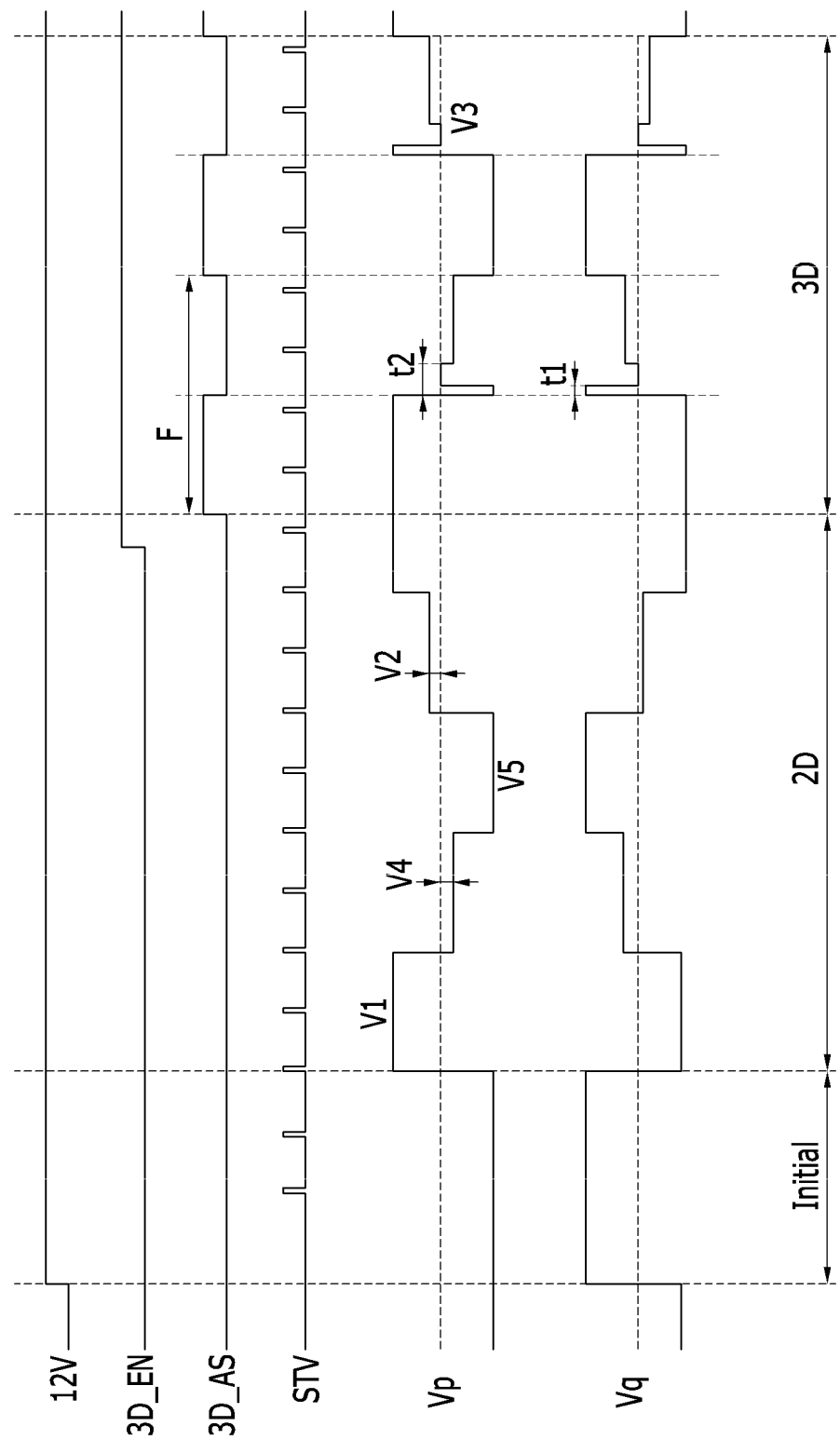
FIG. 4 is a signal waveform diagram of a driver of a polarization switching panel according to an exemplary embodiment of the present invention.
Figure 5:
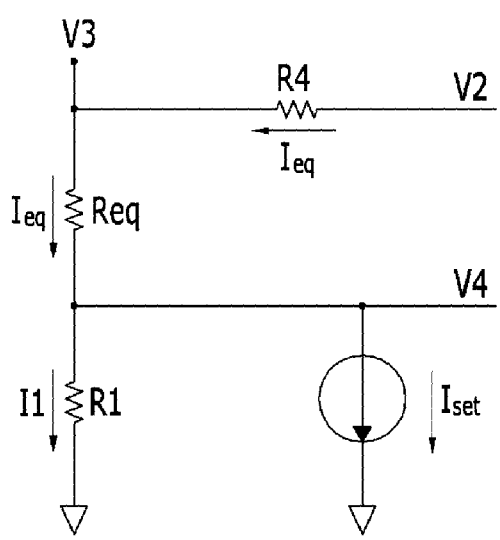
FIG. 5 is an equivalent circuit diagram of a symmetrical voltage changing circuit according to an exemplary embodiment of the present invention.

FIG. 1 is a view schematically showing an operation of a polarization switching device according to an exemplary embodiment of the present invention, FIG. 2 is a cross-sectional view schematically showing a polarization switching device according to an exemplary embodiment of the present invention, FIG. 3 is a view schematically showing a driver of a polarization switching panel according to an exemplary embodiment of the present invention, FIG. 4 is a signal waveform diagram of a driver of a polarization switching panel according to an exemplary embodiment of the present invention, and FIG. 5 is an equivalent circuit diagram of a symmetrical voltage changing circuit according to an exemplary embodiment of the present invention.

Referring to FIG. 1, a polarization switching device 900 may change linear polarization emitted through a display device 100 to left and right circular polarization. A left eye image and a right eye image may be separated through polarized glasses 350, which create a three-dimensional effect. The display device 100 and the polarization switching device 900 may transmit and receive a 3D sync signal (3D_AS) to and from each other. For example, left-eye circular polarization and right-eye circular polarization may be switched by the 3D sync signal (3D_AS) in the polarization switching device 900.

Referring to FIG. 2, a display device 100 may include a liquid crystal display, an organic light emitting device, a plasma display device, an electrophoretic display, and the like. For example, when the display device 100 is a liquid crystal display, the display device 100 may have an operating frequency of 240 Hz or more.

The polarization switching device 900 may include a lower panel 910, a liquid crystal layer 920, and an upper panel 930. The lower panel 910 may include a lower substrate, a lower electrode disposed on the lower substrate, a passivation layer, and the like. The upper panel 930 may include an upper substrate, an upper electrode disposed on the upper substrate, a passivation layer, and the like. The liquid crystal layer may include a twisted nematic (TN) mode liquid crystal, a vertically aligned (VA) mode liquid crystal, an electrically controlled birefringence (ECB) mode liquid crystal, or the like. The polarization switching device 900 may include a retarder film 940. A driver 800 to drive the polarization switching device 900 is connected to the polarization switching device 900. For example, the driver 800 may be connected to the polarization switching device 900 through a flexible printed circuit 20.

The display device 100 and the polarization switching device 900 may be coupled with each other by an optical bonding member 10.

Referring back to FIG. 1, the liquid crystal layer 920 may be aligned in an angular direction of approximately +45 or −45 degrees with respect to a polarization direction of emission light of the display device 100. The liquid crystal layer 920 may be aligned in a direction of +45 or −45 degrees based on the level of the applied voltage.

Referring to FIG. 3, the driver 800 of the polarization switching device 900 may include a controller 810, a memory 820, a symmetric voltage changing unit 830, a voltage compensation unit 860, a voltage selecting unit 850, and voltage generating units 840 and 870.

The controller 810 controls signal input to the polarization switching device 900 and is connected to a digital-analog converter DAC, the memory 820, and a multiplexer MUX to control these elements. For example, the controller 810 may perform communication using an inter integrated circuit (I2C) scheme. I2C is a communication standard between a microprocessor and low-speed peripherals. I2C includes a serial clock signal (SCL) for synchronization and serial data (SDA) transmitting data. I2C is a master-slave scheme. The memory 820, the digital-analog converter DAC, and the multiplexer MUX may be connected with the controller 810 using the I2C scheme and transmit and receive 7-bit digital data.

For example, the controller 810 may receive a scan starting signal STV to start scanning of the polarization switching device 900, a 3D enable signal 3D_EN to enable input of a 3D image signal, and a 3D sync signal 3D_AS to switch left and right circular polarization of the polarization switching device 900. The memory 820 may receive a memory control signal WP.

The voltage generating units 840 and 870 generate driving voltages V1, V2, V3, and V4 to drive the polarization switching device 900. A reference voltage V1 and a center voltage V3 are generated by the digital-analog converter DAC connected to the controller 810. For example, the reference voltage V1 may be generated by the voltage generating unit 870, which may include a coil, a diode, a capacitor and a duty controlling unit 880. When 12 V is input to the voltage generating unit 870, the reference voltage V1 of 20 V may be generated. The duty controlling unit 880 controls a duty ratio of the reference voltage V1. Digital data input to the digital-analog converter DAC from the controller 810 may be directly converted into the center voltage V3, and the center voltage V3 may be input to the voltage selecting unit 850 through an operational amplifier.

The symmetric voltage changing unit 830 generates a first voltage V4 through the digital-analog converter DAC and two resistors R1 and R2 connected to the controller 810, and generates a second voltage V2 symmetrical to the first voltage V4 by two resistors R3 and R4 and one operational amplifier without a separate digital-analog converter DAC. The two resistors R3 and R4 may have substantially the same resistance value. For example, when the first voltage V4 is controlled by the digital data input to the digital-analog converter DAC through the controller 810, the second voltage V2 may be varied by interworking with the first voltage V4. In this case, the first voltage V4 and the second voltage V2 may be symmetrical with respect to the center voltage V3 by a certain offset voltage Vo. Therefore, both the first voltage V4 and the second voltage V2 may be generated by inputting digital data to a single digital-analog converter DAC in order to apply the offset voltage Vo due to a delicate difference among manufactured polarization switching devices 900. As a result, it is possible to easily vary a driving voltage, and to improve workability of controlling the driving voltage.

On the other hand, if the first voltage V4 and the second voltage V2 are generated using two digital-analog converters DAC, respectively, workability of controlling the driving voltage may be deteriorated.

The first voltage V4 and the second voltage V2 generated through the symmetric voltage changing unit 830 may be transferred to the voltage selecting unit 850 through the operational amplifier of the voltage generating unit 840, respectively.

The voltage selecting unit 850 transfers the voltages V1, V2, V3, and V4 generated through the voltage generating units 840 and 870 to the polarization switching device 900. For example, the voltage selecting unit 850 may be a 5:2 MUX.

The voltage compensation unit 860 may compensate for the voltages V1, V2, V3, and V4 using transistors. The voltage compensation unit 860 may be omitted.

Referring to FIG. 4, a driving voltage Vp applied to the lower panel 910 of the polarization switching device 900 and a driving voltage Vq applied to the upper panel 930 are shown at an initial period, a 2D driving period, and a 3D driving period, respectively. The reference voltage V1 is a high level voltage, a low voltage V5 is a low level voltage, and for example, the reference voltage V1 may be 20 V and the low voltage V5 may be 0 V. The center voltage V3, the first voltage V4, and the second voltage V2 may have values between the reference voltage V1 and the low voltage V5. The reference voltage V1 and the low voltage V5 may be symmetrical to each other with respect to the center voltage V3 and the first voltage V4 and the second voltage V2 may be symmetrical to each other with respect to the center voltage V3. The driving voltage Vp applied to the lower panel 910 and the driving voltage Vq applied to the upper panel 930 may be symmetrical to each other with respect to the center voltage V3. Widths of a first time t1 and a second time t2 may be appropriately controlled depending on the manufactured polarization switching device 900. For example, the frequency of the 3D sync signal 3D_AS of the driver 800 may be 60 Hz.

Referring to FIG. 3 and FIG. 5, the first voltage V4 may be generated based on a voltage divider circuit including two resistors R1 and R2. When Iset=0, the first voltage V4 and the second voltage V2 are substantially the same as each other and the offset voltage Vo is 0. The maximum value of the first voltage V4 is R1/(R1+R2). When a single digital-analog converter DAC receives 7-bit digital data, Iset may be controlled in 128 steps and the offset voltage Vo may be determined based on the value of Iset, such that the first voltage V4 and the second voltage V2 may be determined. The digital data input to the digital-analog converter DAC may be appropriately tuned in order to uniformly drive the polarization switching devices 900 by controlling the delicate difference among the manufactured polarization switching devices 900.

FIG. 5 is an equivalent circuit diagram of the symmetric voltage changing unit 830 of FIG. 3. Referring to FIG. 5, the following Equations 1 to 4 are derived.

$$I1 = \frac{V4}{R1} \quad \text{[Equation 1]}$$

$$Ieq = \frac{V3 - V4}{Req} \quad \text{[Equation 2]}$$

$$Iset = Ieq - I1 \quad \text{[Equation 3]}$$

$$Ieq = \frac{V2 - V3}{R4} \quad \text{[Equation 4]}$$

In the case where resistance values of R3 and R4 are R, when the first voltage V4 and the second voltage V2 are calculated using Equations 1 to 4, each of the first voltage V4 and the second voltage V2 may be represented by R1, R, Req, V3, and Iset. Req is represented by the following Equation 5.

$$Req = \frac{R2 \cdot R3}{R2 + R3} \quad \text{[Equation 5]}$$

The first voltage V4 and the second voltage V2 are represented by the following Equations 6 and 7, respectively and in the case of R1>>R and R2>>R, may be represented by V3, Iset, and R.

$$V4 = \frac{R1 \cdot Req}{R1 + Req}\left[\frac{V3}{Req} - Iset\right] \approx V3 - R \cdot Iset \quad \text{[Equation 6]}$$

$$V2 = \frac{1}{R1 + Req}[(Req + R1 + R) \cdot V3 + R \cdot R1 \cdot Iset] \approx V3 - R \cdot Iset \quad \text{[Equation 7]}$$

As represented by Equations 6 and 7, the first voltage V4 and the second voltage V2 are symmetrical to each other with respect to the center voltage V3 by the offset voltage Vo, and the offset voltage Vo may be controlled by controlling Iset.

For example, when the digital-analog converter DAC receives 7-bit digital data d, Iset may satisfy the following Equation 8.

$$Iset = \frac{V1}{Rset} \times \frac{d}{128} \quad \text{[Equation 8]}$$

According to exemplary embodiments of the present invention, a driving voltage of a polarization switching panel may be easily varied and workability of controlling the driving voltage of the polarization switching panel may be improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarization switching device, comprising:
   a lower panel;
   an upper panel facing the lower panel;
   a liquid crystal layer disposed between the lower panel and the upper panel; and
   a driver to apply a first driving voltage and a second driving voltage to the lower panel and the upper panel, respectively, the first driving voltage to transition among a center voltage, a first voltage and a second voltage, the first voltage and the second voltage having the same difference in value from the center voltage,
   wherein:
   the driver comprises a voltage changing unit to generate the first voltage and the second voltage by a first digital-analog converter based on the center voltage and a digital data input therein; and
   the first voltage and the second voltage are configured to dynamically change based on the digital data input.

2. The polarization switching device of claim 1, wherein:
   the voltage changing unit comprises
   a first resistor and a second resistor to divide the center voltage,
   an operational amplifier comprising a first input terminal to receive the center voltage and an output terminal to output the second voltage, and
   a third resistor and a fourth resistor connected to a second input terminal of the operational amplifier in parallel.

3. The polarization switching device of claim 2, wherein:
   the third resistor is connected between the first resistor and the second resistor and the fourth resistor is connected to the output terminal.

4. The polarization switching device of claim 1, wherein:
   the voltage changing unit comprises:
   a first resistor comprising a grounded first terminal and a second terminal configured to receive the first voltage, a current source connected to a grounded first terminal and a second terminal configured to receive the first voltage, an equivalent resistor comprising a second resistor and a third resistor that are connected to a first terminal configured to receive the first voltage, and a second terminal configured to receive the center voltage, the second resistor and the third resistor being connected to each other in parallel, and a fourth resistor comprising a first terminal configured to receive the center voltage, and a second terminal configured to receive the second voltage.

5. The polarization switching device of claim 4, wherein:
the first voltage and the second voltage satisfy the following Equations 6 and 7:

$$V4 = \frac{R1 \cdot Req}{R1 + Req}\left[\frac{V3}{Req} - Iset\right] \approx V3 - R \cdot Iset \quad \text{[Equation 6]}$$

$$V2 = \frac{1}{R1 + Req}[(Req + R1 + R) \cdot V3 + R \cdot R1 \cdot Iset] \approx V3 - R \cdot Iset \quad \text{[Equation 7]}$$

in Equations 6 and 7, V4 is the first voltage, V2 is the second voltage, V3 is the center voltage, R1 is a resistance of the first resistor, Req is a resistance of the equivalent resistor, and Iset is a current flowing in the current source.

6. The polarization switching device of claim 5, wherein:
the Iset satisfies the following Equation 8:

$$Iset = \frac{V1}{Rset} \times \frac{d}{128} \quad \text{[Equation 8]}$$

in Equation 8, V1 is a voltage applied to the current source, Rset is a resistance of the current source, and d is digital data.

7. The polarization switching device of claim 1, wherein:
the driver further comprises
a controlling unit to control a signal input to the polarization switching device,
a second digital-analog converter connected to the controlling unit to generate the center voltage, a third digital-analog converter connected to the controlling unit to generate a high-level reference voltage, and a voltage generating unit connected to the voltage changing unit, and
a voltage selecting unit to selectively output some of the reference voltage, the center voltage, the first voltage, and the second voltage.

8. The polarization switching device of claim 7, wherein:
the driver further comprises a voltage compensation unit to compensate for the center voltage, the first voltage, and the second voltage.

9. The polarization switching device of claim 1, wherein:
the first driving voltage transitions between a high-level reference voltage and a low-level low voltage, the high-level reference voltage and the low-level low voltage have the same difference in value from the center voltage with different polarities from each other, and each of the first voltage and the second voltage is smaller than the reference voltage.

10. The polarization switching device of claim 1, wherein:
the first driving voltage and the second driving voltage have the same difference in value from the center voltage with different polarities from each other.

11. The polarization switching device of claim 10, wherein:
the liquid crystal layer is aligned at +45 or −45 degrees based on whether a voltage is applied to the upper panel and the lower panel.

12. A driver of a polarization switching device, comprising:
a voltage changing unit to generate a first voltage and a second voltage having the same difference in value from a center voltage based on the center voltage and digital data input to a first digital-analog converter,
wherein:
the driver is configured to left-eye circularly polarize or right-eye circularly polarize linearly polarized light; and
the first voltage and the second voltage are configured to dynamically change based on the digital data input.

13. The driver of claim 12, wherein:
the voltage changing unit comprises
a first resistor and a second resistor to divide the center voltage,
an operational amplifier comprising a first input terminal to receive the center voltage and an output terminal to output the second voltage, and
a third resistor and a fourth resistor connected to a second input terminal of the operational amplifier in parallel.

14. The driver of claim 13, wherein:
the third resistor is connected between the first resistor and the second resistor and the fourth resistor is connected to the output terminal.

15. The driver of claim 12, wherein:
the voltage changing unit comprises:
a first resistor comprising a grounded first terminal and a second terminal configured to receive the first voltage,
a current source connected to a grounded first terminal and a second terminal configured to receive the first voltage,
an equivalent resistor comprising a second resistor and a third resistor that are connected to a first terminal configured to receive the first voltage, and a second terminal configured to receive the center voltage, the second resistor and the third resistor being connected to each other in parallel, and
a fourth resistor comprising a first terminal configured to receive the center voltage, and a second terminal configured to receive the second voltage.

16. The driver of claim 15, wherein:
the first voltage and the second voltage satisfy the following Equations 6 and 7:

$$V4 = \frac{R1 \cdot Req}{R1 + Req}\left[\frac{V3}{Req} - Iset\right] \approx V3 - R \cdot Iset \quad \text{[Equation 6]}$$

$$V2 = \frac{1}{R1 + Req}[(Req + R1 + R) \cdot V3 + R \cdot R1 \cdot Iset] \approx V3 - R \cdot Iset \quad \text{[Equation 7]}$$

in Equations 6 and 7, V4 is the first voltage, V2 is the second voltage, V3 is the center voltage, R1 is a resistance of the first resistor, Req is a resistance of the equivalent resistor, and Iset is a current flowing in the current source.

17. The driver of claim 16, wherein:
the Iset satisfies the following Equation 8:

$$Iset = \frac{V1}{Rset} \times \frac{d}{128} \quad \text{[Equation 8]}$$

in Equation 8, V1 is a voltage applied to the current source, Rset is a resistance of the current source, and d is digital data.

18. The driver of claim 12, further comprising:
a controlling unit to control a signal input to the polarization switching device,
a second digital-analog converter connected to the controlling unit to generate the center voltage, a third digital-analog converter connected to the controlling unit to generate a high-level reference voltage, and a voltage generating unit connected to the voltage changing unit, and
a voltage selecting unit to selectively output some of the reference voltage, the center voltage, the first voltage, and the second voltage.

19. The driver of claim 18, further comprising:
a voltage compensation unit to compensate for the center voltage, the first voltage, and the second voltage.

20. The driver of claim 12, wherein:
the first driving voltage transitions between a high-level reference voltage and a low-level low voltage, the high-level reference voltage and the low-level low voltage have the same difference in value from the center voltage with different polarities from each other, and each of the first voltage and the second voltage is smaller than the reference voltage.

21. A method of driving a polarization switching device, comprising:
generating a first voltage and a second voltage based on a center voltage and a digital data input to a first digital-analog converter, the first voltage and the second voltage having the same difference in value from the center voltage with different polarities from each other;
transitioning the first driving voltage among the center voltage, a first voltage and a second voltage; and
applying the first driving voltage and the second driving voltage to a lower panel and an upper panel, respectively,
wherein the first voltage and the second voltage dynamically change based on the digital data input.

* * * * *